United States Patent
Raimondi et al.

(10) Patent No.: US 10,687,661 B2
(45) Date of Patent: Jun. 23, 2020

(54) COFFEE MACHINE, MORE PARTICULARLY ESPRESSO COFFEE MACHINE, AND METHOD FOR OPERATING SAID COFFEE MACHINE

(71) Applicant: Rancilio Group S.P.A., Villastanza di Parabiago (MI) (IT)

(72) Inventors: Stefano Raimondi, Villastanza di Parabiago (IT); Stefano Mascaretti, Villastanza di Parabiago (IT); Riccardo Turni, Villastanza di Parabiago (IT); Claudio Fenaroli, Villastanza di Parabiago (IT)

(73) Assignee: RANCILIO GROUP S.P.A., Villastanza di Parabiago (IT)

( * ) Notice: Subject to any disclaimer, the term of this patent is extended or adjusted under 35 U.S.C. 154(b) by 0 days.

(21) Appl. No.: 16/316,818

(22) PCT Filed: Jun. 14, 2018

(86) PCT No.: PCT/IB2018/054367
§ 371 (c)(1),
(2) Date: Jan. 10, 2019

(87) PCT Pub. No.: WO2018/234948
PCT Pub. Date: Dec. 27, 2018

(65) Prior Publication Data
US 2019/0307288 A1    Oct. 10, 2019

(30) Foreign Application Priority Data

Jun. 21, 2017    (IT) .................... 102017000069357

(51) Int. Cl.
*A47J 31/54*    (2006.01)
*A47J 31/34*    (2006.01)
(Continued)

(52) U.S. Cl.
CPC ............ *A47J 31/545* (2013.01); *A47J 31/34* (2013.01); *A47J 31/46* (2013.01); *A47J 31/56* (2013.01)

(58) Field of Classification Search
CPC .......... A47J 31/545; A47J 31/34; A47J 31/46; A47J 31/56
(Continued)

(56) References Cited

U.S. PATENT DOCUMENTS 5,613,422 A * 3/1997 Giuliano ................ A47J 31/36
99/281
8,607,690 B1 * 12/2013 Bresciani .............. A47J 31/542
99/279
(Continued)

FOREIGN PATENT DOCUMENTS

WO    94/00045 A1    1/1994

*Primary Examiner* — Dana Ross
*Assistant Examiner* — Ket D Dang
(74) *Attorney, Agent, or Firm* — Howson & Howson LLP

(57) ABSTRACT

The present invention relates to a coffee machine, more particularly to an espresso coffee machine. The coffee machine according to the invention comprises at least one hot water generator (1, 3), at least one brewing group (5) for brewing coffee, and a thermosiphon circuit between said hot water generator and said brewing group including a hot water supply pipe (13) and a hot water return pipe (15). According to the invention, one or more additional hot water supply pipes (13'), separate from said main hot water supply pipe (13), are provided between said hot water generator (1, 3) or another hot water source and said brewing group (5). Thanks to this arrangement, it is possible to guarantee a greater steadiness in the water temperature during the steps of brewing coffee, and possibly the capability of quickly adjusting, even in real time, said temperature. Furthermore, if several brewing groups are provided, the water temperature during the brewing step can be advantageously con-
(Continued)

trolled and adjusted in an autonomous and independent manner for each brewing group.

6 Claims, 3 Drawing Sheets

(51) Int. Cl.
*A47J 31/46* (2006.01)
*A47J 31/56* (2006.01)

(58) Field of Classification Search
USPC ....... 99/295, 299, 300, 32 R, 32 P, 279, 280, 99/281, 282, 293; 426/433
See application file for complete search history.

(56) References Cited

U.S. PATENT DOCUMENTS

| | | |
|---|---|---|
| 9,495,616 B2 | 11/2016 | Carbonini |
| 10,154,754 B2 | 12/2018 | Carbonini |
| 2001/0042444 A1* | 11/2001 | Huber .................. A47J 31/4478 99/279 |
| 2011/0113970 A1* | 5/2011 | Liu ....................... A47J 31/465 99/300 |
| 2011/0252976 A1 | 10/2011 | Liu |
| 2015/0374168 A1* | 12/2015 | Sampoli .................. A47J 31/56 426/433 |
| 2018/0042290 A1 | 2/2018 | Buhlmann et al. |

* cited by examiner

COFFEE MACHINE, MORE PARTICULARLY ESPRESSO COFFEE MACHINE, AND METHOD FOR OPERATING SAID COFFEE MACHINE

TECHNICAL FIELD

The present invention relates to a coffee machine.

More particularly the present invention relates to an espresso coffee machine.

BACKGROUND ART

Coffee machines are known having a wide variety of structures and operating principles.

In particular, espresso coffee machines are known, in which coffee is prepared by a process of percolation of hot water at high pressure.

In all coffee machines, and more particularly in espresso coffee machines, the quality of the obtained coffee depends on a plurality of factors, in part relating to the raw material (the used coffee, its blend, the grinding quality and degree) and in part relating to the performances of the coffee machine itself, with particular reference to the operating pressure profiles and to water temperature during coffee brewing.

Operating pressure and water temperature must have well determined values in order to obtain a high quality espresso coffee, in which all aromas are optimally extracted from coffee powder. Operating pressure should preferably be of about 9 bar, while water temperature should preferably be comprised between 88° and 96° C. depending on the kind of used coffee blend.

In general, in a per se known manner, coffee machines comprise a hot water generator for obtaining hot water at a desired temperature and at least a brewing group for producing coffee. Said hot water generator may consist of a dedicated boiler for the water to be supplied to the brewing group or of a boiler provided with a heat exchanger. The hot water generator is connected at one side to a cold water source, from which it takes cold water and at the other side to the brewing group for supplying hot water to said brewing group. Cold water entering the hot water generator may come from a water tank or directly from the water mains and the coffee machine comprises a feeding pump for feeding cold water to said hot water generator. The hot water generator allows to heat cold water, thus obtaining heated water at a desired temperature, which is transferred to the brewing group, where it comes into contact with the coffee blend during the espresso coffee brewing step.

Preferably, hot water is transferred from the hot water generator to the brewing group not only during the coffee brewing step, but also during stand-by times between a brewing step and the following one. This allows to keep the brewing group at an adequate temperature, preventing it from cooling down to room temperature in case of long stand-by times between a brewing step and the following one.

To this purpose, the coffee machine, besides a hot water supply pipe from the hot water generator to the brewing group, further comprises a hot water return pipe from the brewing group to the hot water generator: hot water continuously flows by natural convection in the circuit formed by the hot water supply pipe and the hot water return pipe, transfers heat to the brewing group for raising the temperature thereof and finally goes back to the hot water generator at a lower temperature. Here, water coming from the return pipe is heated again, thus inducing a variation in its density. This makes the heated water move upwards, towards the hot water supply pipe, thus promoting water circulation between the hot water generator and the brewing group. During these stand-by times between a brewing step and the following one, no additional cold water is fed to the hot water generator.

The continuous flow of hot water in this circuit allows to keep the temperature of the brewing group at an adequate level and for this reason it is called "thermosiphon circuit".

The provision of such thermosiphon circuit allows a good thermal steadiness during the stand-by steps between a brewing step and the following one, a very quick operating resumption for the following brewing step and a correct brewing temperature as from the very first brewing step.

An example of a known espresso coffee machine of this kind is disclosed in WO 94/000045.

A further example of a known espresso machine of this kind is disclosed in US 2011/0252976.

US 2011/0252976 discloses a coffee machine including a hot water generator, a brewing group for brewing coffee, a cold water supply pipe connecting a cold water source to the hot water generator, a hot water supply pipe connecting the hot water generator to the brewing group and a hot water return pipe connecting the brewing group back to the water generator. The hot water supply pipe is branched, so that hot water coming from the hot water generator flows through a first branch of said hot water supply pipe and then through the brewing group and the coffee powder during the brewing step, while it flows through a second branch of said hot water supply pipe and then through the brewing group (without coming into contact with the coffee powder) and through the hot water return pipe during the stand-by steps between a brewing step and the following one. Thanks to this arrangement, a pre-heating of the brewing group during the stand-by steps between a brewing step and the following one can be achieved.

However, even if the provision of a thermosiphon circuit as disclosed above allows a very quick operating resumption after a stand-by time between a brewing step and the following one, it cannot guarantee a steady water temperature during said brewing steps.

Yet, steadiness in water temperature during the brewing step is an essential parameter for the quality of the obtained coffee.

Moreover, the provision of a thermosiphon circuit as disclosed above cannot allow to accurately and promptly adjust the water temperature during said brewing steps.

On the other hand, in order to obtain a high quality coffee, it is necessary to be able to adjust the water temperature during the brewing step, in particular according to the characteristics of the used raw material (coffee blend, grinding degree, and so on).

The main object of the present invention is therefore to provide a coffee machine which is free from the above-mentioned limitations of prior art and, more particularly, which allows to keep the water temperature steady during the brewing step.

Another object of the present invention is to provide a coffee machine which allows to control and quickly and accurately adjust the water temperature during the brewing step, independently from the water temperature in the thermosiphon circuit, so that the brewing temperature and the temperature of the brewing group during the stand-by times between a brewing step and the following one are independent from each other.

A further object of the present invention is to provide a coffee machine in which, if several brewing groups are provided, the water temperature during the brewing step can be autonomously and independently controlled and adjusted in each brewing group.

These and other objects are achieved by a coffee machine as claimed in the appended claims.

DISCLOSURE OF INVENTION

The coffee machine according to the invention comprises a water thermosiphon circuit including a main hot water supply pipe and a hot water return pipe, and it further includes one or more additional, separate hot water supply pipes.

In the stand-by intervals between a brewing step and the following one, hot water is made to circulate from the hot water generator to the brewing group through the hot water supply pipes, and back from the brewing group to the hot water generator through the hot water return pipe, the water flow through said one or more additional hot water supply pipes being preferably limited with respect to the water flow through the main hot water supply pipe.

During the brewing step, the water flow through said one or more additional hot water supply pipes is allowed and hot water is transferred to a brewing duct in the brewing group (which is located at a different position in the brewing group with respect to the position of thermosiphon circuit) both through the main hot water supply pipe and through said one or more additional hot water supply pipes.

Advantageously, the provision of one or more additional hot water supply pipes allows to lead hot water from said hot water generator to said brewing group, namely to the coffee contained in said brewing group, in a faster manner; experimental tests carried out by the Applicant have surprisingly shown that, thanks to such arrangement, it is possible to keep the water temperature during the brewing step steadier and independent from the temperature value in the thermosiphon circuit during the stand-by steps between a brewing step and the following one.

Such a result could not be achieved in known coffee machines provided with a thermosiphon circuit such as the one disclosed in WO 94/000045 or in US 2011/0252976, in which it is not possible to provide additional flow(s) of hot water to the brewing group through additional, separate hot water supply pipe(s).

In a preferred embodiment, the coffee machine according to the invention comprises means for adjusting the flow rate along at least one of said one or more additional hot water supply pipes, said flow rate adjusting means being electrically and/or mechanically adjustable.

Thanks to such arrangement, the flow rate of the additional hot water supply pipe(s) provided with adjusting means can be adjusted and adjusting the hot water flow rate arriving at the brewing group allows an accurate and prompt adjustment of the water temperature during the brewing step.

In a preferred embodiment, the coffee machine according to the invention may further comprise means for adjusting the flow rate along said main hot water supply pipe and/or said hot water return pipe.

In a further embodiment of the invention, in addition or in alternative to the flow rate adjusting means provided along the various pipes of the coffee machine according to the invention, the brewing group comprises a connecting portion arranged between said pipes and the brewing duct of said brewing group and said connecting portion comprises a plurality of channels designed so as to suitably direct the hot water flow in accordance with the various operating steps of the coffee machine.

BRIEF DESCRIPTION OF DRAWINGS

Some preferred embodiments of the invention will be described by way of nonlimiting example with reference to the attached drawings, in which.

MODES FOR CARRYING OUT THE INVENTION

Figure 1:
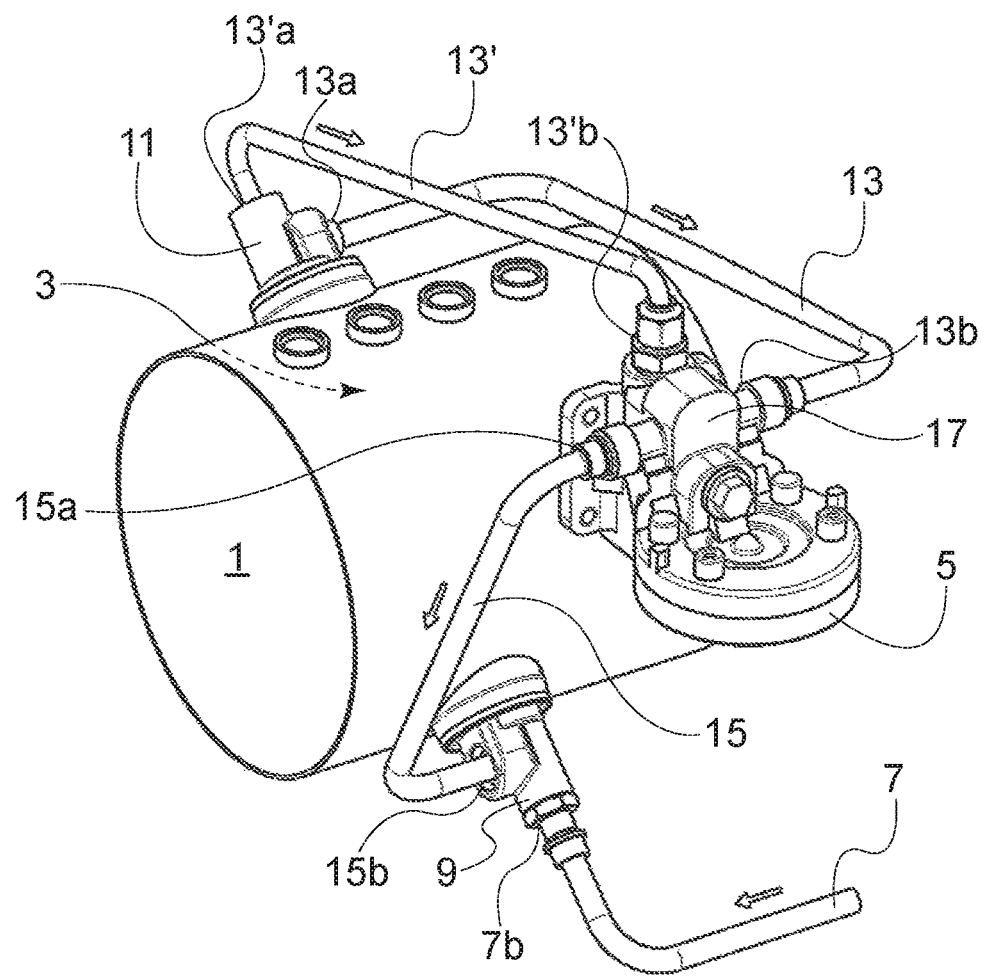
FIG. 1 shows the main components of a coffee machine according to a first embodiment of the invention.

Initially referring to FIG. 1, a preferred embodiment of the coffee machine according to the invention is shown.

In a per se known manner, said coffee machine comprises a hot water generator—which in the shown embodiment comprises a boiler 1 provided with a heat exchanger 3—and at least one brewing group 5.

The boiler 1 with its heat exchanger 3 and the brewing group 5 can be implemented in any way within the reach of the person skilled in the art of coffee machines, namely of espresso coffee machines, and the boiler 1 with its heat exchanger 3 may optionally be replaced by a dedicated boiler.

The heat exchanger 3 in the boiler 1 receives cold water from a cold water supply pipe 7 connected to a cold water source, i.e. having a cold water supply pipe inlet at the cold water source and a cold water supply pipe outlet 7*b* at the heat exchanger 3.

The boiler 1 is cylindrical and contains a fluid, preferably a mixture of water and steam, which is heated by a heating element (not shown in the Figure) immersed in said boiler. The heat exchanger 3 is located inside said boiler 1. By way of example, the heat exchanger may be a cylindrical tube with a concentric cold water injector.

The heat exchanger 3 is directly connected to a main hot water supply pipe 13 leading hot water to the brewing group 5. In other words, the main hot water supply pipe 13 has a main hot water supply pipe inlet 13*a* at the heat exchanger 3 and a main hot water supply pipe outlet 13*b* at the brewing group 5.

During the coffee brewing steps, hot water coming from the main hot water supply pipe 13 is introduced into a brewing duct of the brewing group 5 and, through it, to the coffee powder, as will be explained in detail below.

During the stand-by steps between a brewing step and the following one, hot water coming from the main hot water supply pipe 13 passes through an area of the brewing group separate from the brewing duct, where it transfers heat to said brewing group, and, after having transferred heat to said brewing group, it is led back to the heat exchanger 3 through a hot water return pipe 15, having a hot water return pipe inlet 15*a* at the brewing group 5 and a hot water return pipe outlet 15*b* at the heat exchanger 3.

During the brewing step, the heat exchanger 3 allows the heat exchange between the cold water coming from the cold water supply pipe 7 and the high temperature fluid in the boiler 1; on the other hand, during the stand-by steps between a brewing step and the following one, said heat exchanger promotes heat exchange between the water coming from the hot water return pipe 15 and the high temperature fluid in the boiler 1, thus allowing to maintain circulation in the hot water supply and return pipes.

To this purpose, the heat exchanger 3 can be provided with a first T-joint 9 arranged upstream of the heat exchanger 3, which T-joint is connected to the cold water supply pipe 7 (namely to the cold water supply pipe outlet 7b), the hot water return pipe 15 (namely to the hot water return pipe outlet 15b) and the heat exchanger 3. The main hot water supply pipe 13 and the hot water return pipe 15 form, together with the heat exchanger 3, a thermosiphon circuit allowing to keep the brewing group 5 at a given temperature even during the stand-by intervals between a coffee brewing step and the following one.

According to the invention, the coffee machine comprises one or more additional hot water supply pipes 13', separate from the main hot water supply pipe 13, connecting the heat exchanger 3 to the brewing group 5. In other words, the additional hot water supply pipe(s) 13' has/have an additional hot water supply pipe inlet 13'a, separate from the main hot water supply pipe inlet 13a, at the heat exchanger 3, and an additional hot water supply pipe outlet 13'b, separate from the main hot water supply pipe outlet 13b, at the brewing group 5.

In the embodiment of FIG. 1, only one additional hot water supply pipe 13' is provided.

Correspondingly, the heat exchanger 3 is provided with a second T-joint 11 arranged downstream of the heat exchanger 3, which T-joint is connected to the heat exchanger 3, the main hot water supply pipe 13 (namely, the main hot water supply pipe inlet 13a) and the additional hot water supply pipe 13'(namely, the additional hot water supply pipe inlet 13'a).

If a higher number of additional hot water supply pipes 13' were provided, the joint downstream of the heat exchanger 3 would be correspondingly designed so as to connect all the additional hot water supply pipes (namely, all the additional hot water supply pipe inlets 13'a) to said heat exchanger.

As will be explained in greater detail below, the resistance to the passage of hot water flow through the main and additional hot water supply pipes can be adjusted according to the different operating steps of the coffee machine.

More particularly, hot water flow through said additional hot water supply pipes 13' is substantially limited during the stand-by intervals between a brewing step and the following one, whereas it is certainly allowed during the brewing step, promoting a rapid inflow of hot water towards the coffee powder contained in the brewing group.

Experimental tests carried out by the Applicant have shown that leading hot water from the heat exchanger 3 to the brewing group 5 (and to the coffee powder contained therein) in a faster way advantageously allows to obtain a steadier and adjustable brewing temperature, with corresponding advantages in the quality of the brewed coffee.

Figure 3:
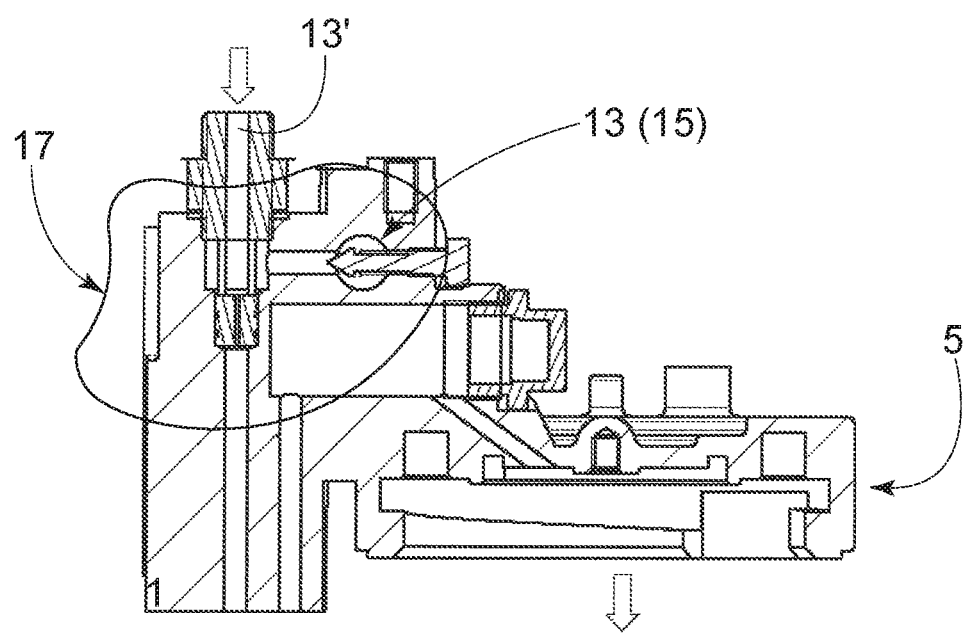
FIG. 3 is a cross-sectional view of a detail concerning the brewing group of the coffee machine of FIGS. 1 and 2.

Correspondingly, the brewing group 5 comprises a connecting portion 17 arranged between the pipes 13, 13', 15 and the brewing duct of said brewing group 5 and said connecting portion is provided with a plurality of channels designed so as to suitably direct the hot water flow in accordance with the different operating steps of the coffee machine (see FIG. 3).

More particularly, the channels of the connecting portion 17 of the brewing group 5 are designed so that during the stand-by intervals between a coffee brewing step and the following one they prevent hot water from flowing towards the brewing duct of the brewing group 5, and promote, on the contrary, the water flow towards the hot water return pipe 15 through a path having a lower resistance to the flow passage.

At the same time, said channels of said connecting portion 17 of the brewing group 5 are designed so that during the brewing step they promote, through a path having a lower resistance to the flow passage, the hot water flow from the main hot water supply pipe 13 and the additional hot water supply pipe 13' towards the brewing duct of the brewing group and, through it, towards the coffee powder contained in said brewing group 5.

It is evident that, if a higher number of additional hot water supply pipes is provided, the shape of said channels of the brewing group 5 will be correspondingly modified for taking into account the number of said additional hot water supply pipes.

The operation of the coffee machine according to the invention is as follows.

During the stand-by steps between a brewing step and the following one, the cold water supply pipe 7 is shut upstream of the first T-joint 9. The water in the heat exchanger 3 is heated by the fluid (water+steam) in the boiler and, due to such heating, its density decreases. As a result, the water moves upwards through said heat exchanger 3 towards the second T-joint 11 and then towards the main hot water supply pipe 13, thus pushing the water in the subsequent portion of the main hot water supply pipe 13 towards the brewing group 5.

Once in the brewing group 5, the hot water releases heat to said brewing group 5, thus allowing to keep temperature thereof steady. Due to the heat transfer to the brewing group, the water density increases and the water goes back to the heat exchanger 3 through the hot water return pipe 15. From there, the above disclosed cycle, called thermosiphon circulation, starts again.

In this step, the resistance to the passage of water flow in the main hot water supply pipe 13 at said T-joint 11 is made lower than that in the additional hot water supply pipe 13'. Such arrangement allows the hot water flow coming from the heat exchanger 3 to flow almost completely into said main hot water supply pipe 13 and back into the hot water return pipe 15.

During the brewing step, the cold water supply pipe 7 is open and cold water is pumped into the heat exchanger 3, in which it is heated by the fluid in the boiler 1. The heated water is carried to the brewing duct of the brewing group 5 through both the main hot water supply pipe 13 and the additional hot water supply pipe 13'. Said brewing duct is preferably located at a different position in the brewing group with respect to the position of the thermosiphon circuit.

This configuration advantageously allows to transfer hot water from the heat exchanger 3 directly to the coffee in the brewing group 5 in a very fast way, through both the main and additional hot water supply pipes 13, 13', thus ensuring temperature steadiness during the brewing step.

Preferably, in order to vary the resistance to the passage of hot water flow in the various pipes of the coffee machine, namely in the main hot water supply pipe 13, the additional hot water supply pipe 13' and the hot water return pipe 15, in accordance to the different operating steps of the coffee machine of the invention, suitable adjusting means can be provided along these pipes.

Such adjusting means, together with the suitably designed channels of the connecting portion 17 of the brewing group 5, allow to correctly direct the hot water flow in accordance to the different operating steps of the coffee machine.

Figure 2:
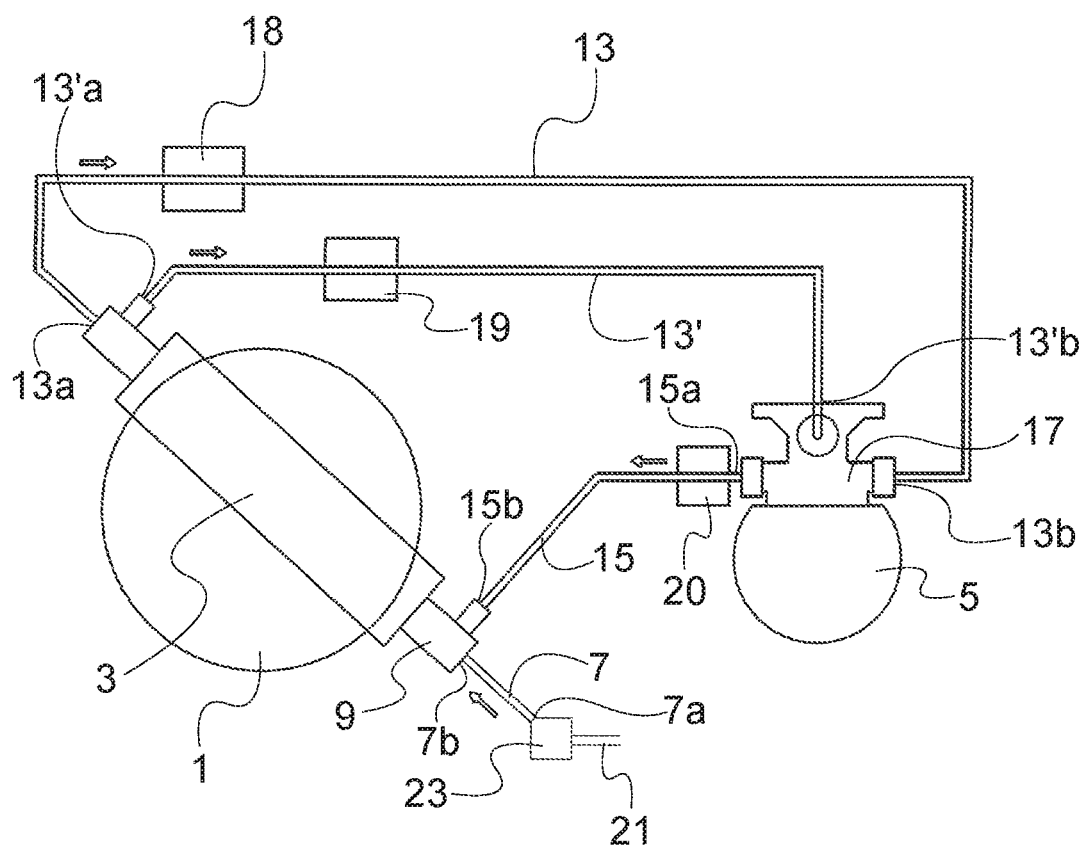
FIG. 2 shows, as a block diagram, the main components of a coffee machine according to a second embodiment of the invention.

In this respect, referring now to FIG. 2, a second preferred embodiment of a coffee machine according to the invention is schematically shown. Such embodiment is similar to the first embodiment shown in FIG. 1, but for the provision of hot water flow rate adjusting means along the main hot water supply pipe 13, the additional hot water supply pipe 13' and the hot water return pipe 15.

In the embodiment of FIG. 2, said flow rate adjusting means are implemented as a first throttle 18 arranged along the main hot water supply pipe 13, a second throttle 19 arranged along the additional hot water supply pipe 13' and a third throttle 20 arranged along the hot water return pipe 15.

The throttles 18, 20 along said main hot water supply pipe 13 and hot water return pipe 15 allow to adjust the temperature of the brewing group 5 in the stand-by steps between the brewing steps, by varying the water circulation speed.

The throttle 19 arranged along the additional hot water supply pipe 13', on the other hand, allows to adjust the water temperature in the brewing step, by varying the water inflow to the brewing group.

Said throttles 18, 19, 20 are preferably electrically and/or mechanically adjustable.

The adjustment of said throttles 18, 19, 20 allows to provide each time different paths with a lower resistance to the flow passage in accordance with the operating step of the coffee machine.

If more than one additional hot water supply pipes were provided, all the additional hot water supply pipes or only some of them could be provided with said throttle.

The brewing temperature can be adjusted, for instance, as a function of the characteristic of the used coffee (blend, grinding degree, and so on).

In alternative embodiments, throttles can be replaced by valves or solenoid valves.

In an alternative embodiment of the invention, throttles (or similar flow rate adjusting means) can be provided in the brewing group 5 rather than along the pipes.

In FIG. 2, the cold water feeding system of the coffee machine is also schematically shown. Said feeding system comprises a cold water source 21 connected to the cold water supply pipe 7 (namely to the cold water supply pipe inlet 7a) and a feeding pump 23, which allows to provide cold water to the cold water supply pipe 7 at a desired pressure.

In a preferred embodiment, the cold water source may be a piping 21 directly connected to the water mains. In an alternative embodiment, said cold water source is a water tank, located inside the coffee machine or connected to it at its outside.

From the above disclosure it will be evident to the person skilled in the art that the coffee machine according to the invention allows to effectively achieve the objects set forth above.

The embodiments as described and illustrated shall not be intended in any way as limiting and several variants and modifications within the reach of the person skilled in the art are possible, still falling within the scope or protection of the present invention as defined by the appended claims.

For instance, although in the described embodiments the additional hot water supply pipe(s) are arranged between the brewing group and the hot water generator of the main hot water supply pipe, if the coffee machine comprises a further hot water generator (e.g. a further boiler/a further heat exchanger), said additional hot water supply pipe(s) could be arranged between said further hot water generator and the brewing group.

Analogously, although in the described embodiments only one brewing group for brewing coffee is provided, it is evident that the invention could be applied to a coffee machine comprising several brewing groups (either all connected to the same hot water generator or each connected to a dedicated hot water generator). In this case, not only the temperature of the water for brewing can be adjusted independently from the thermosiphon circuit temperature, but the temperature of the water for brewing of each brewing group can also be adjusted autonomously and independently from the brewing temperature of the other groups, for instance by specifically and independently controlling the means for adjusting the resistance to the flow passage of the pipes leading to each brewing group.

The invention claimed is:

1. A coffee machine, comprising:
at least one hot water generator,
at least one brewing group for brewing coffee, said at least one brewing group comprising a brewing duct,
a cold water supply pipe connected to a cold water source for supplying cold water to the at least one hot water generator, the cold water supply pipe having a cold water supply pipe inlet at said cold water source and a cold water supply pipe outlet at the at least one hot water generator,
a main hot water supply pipe connecting the at least one hot water generator to the at least one brewing group, the main hot water supply pipe having a main hot water supply pipe inlet at the at least one hot water generator and a main hot water supply pipe outlet at the at least one brewing group, and
a hot water return pipe connecting the at least one brewing group to the at least one hot water generator, said hot water return pipe having a hot water return pipe inlet at the at least one brewing group and a hot water return pipe outlet at the at least one hot water generator,
wherein the coffee machine further comprises one or more additional hot water supply pipes for supplying hot water to the at least one brewing group, the one or more additional hot water supply pipes having one or more additional hot water supply pipe inlets, separate from the main hot water supply pipe inlet, at a hot water source and one or more additional hot water supply pipe outlets, separate from the main hot water supply pipe outlet, at the at least one brewing group, and
wherein the brewing group comprises a connecting portion arranged between the main hot water supply pipe, the one or more additional hot water supply pipes and the hot water return pipe, and the brewing duct of the brewing group, said connecting portion being provided with a plurality of channels, which are designed so that, when brewing coffee, the plurality of channels direct hot water flow from both the main hot water supply pipe and the one or more additional hot water supply pipes toward the brewing duct of the brewing group and, through the brewing duct, toward coffee powder contained in the brewing group, and during stand-by intervals between brewing, the plurality of channels prevents the hot water flow from the main hot water supply pipe and the one or more additional hot water supply pipes toward the brewing duct of the brewing group, directs hot water flow from the main hot water supply pipe into the hot water return pipe, and limits hot water flow through the one or more additional hot water supply pipes.

2. The coffee machine according to claim 1, wherein the hot water source is the at least one hot water generator, and wherein the one or more additional hot water supply pipes are arranged from the at least one hot water generator to the at least one brewing group, the one or more additional hot water supply pipes having the one or more additional hot water supply pipe inlets, separate from the main hot water supply pipe inlet, at the at least one hot water generator and the one or more additional hot water supply pipe outlets, separate from the main hot water supply pipe outlet, at the at least one brewing group.

3. The coffee machine according to claim 1, wherein a throttle is provided along at least one of the one or more additional hot water supply pipes.

4. The coffee machine according to claim 1, wherein a throttle is provided along the main hot water supply pipe.

5. The coffee machine according to claim 1, wherein a throttle is provided along the hot water return pipe.

6. The coffee machine according to claim 1, wherein a throttle is provided inside the at least one brewing group.

* * * * *